United States Patent [19]

Oosten et al.

[11] 4,226,512

[45] Oct. 7, 1980

[54] FILM PROJECTION SYSTEM

[75] Inventors: Hendrik v. Oosten, Leiden; Willem J. P. A. Verbeek, 's-Gravenhage, both of Netherlands

[73] Assignee: N.V. Optische Industrie "De Oude Delft", Delft, Netherlands

[21] Appl. No.: 938,761

[22] Filed: Sep. 1, 1978

[30] Foreign Application Priority Data

Sep. 6, 1977 [NL] Netherlands .......................... 7709798
Jun. 9, 1978 [NL] Netherlands .......................... 7806311

[51] Int. Cl.³ ........................ G03B 21/00; G03B 41/04
[52] U.S. Cl. ..................................... 352/115; 352/129
[58] Field of Search ................ 352/114, 115, 116, 117, 352/105, 106, 129

[56] References Cited

U.S. PATENT DOCUMENTS

| | | |
|---|---|---|
| 1,957,457 | 5/1934 | Holman . |
| 2,410,069 | 10/1946 | Holman ................................ 352/115 |
| 3,138,057 | 6/1964 | Castedello et al. .................... 352/129 |

FOREIGN PATENT DOCUMENTS

97215 12/1896 Fed. Rep. of Germany .
154141 8/1902 Fed. Rep. of Germany .
241124 3/1911 Fed. Rep. of Germany ............ 352/114

*Primary Examiner*—Monroe H. Hayes
*Attorney, Agent, or Firm*—O'Brien & Marks

[57] ABSTRACT

A film projection system comprising a film guiding path, a light source, a projection screen and a rotatable optical system. The optical system comprises a support carrying equidistant identical object lenses whose nodal points traverse a path spaced from the film guiding path a distance substantially equal to the focal distance of the object lenses. The beam or beams emanating from the object lenses are projected and brought into register, respectively, on the projection screen by means of a projection lens. Each object lens may have a given distortion for substantially eliminating any residual unintended motion of the projection of each individual point of the film on the screen.

8 Claims, 5 Drawing Figures

FILM PROJECTION SYSTEM

The invention relates to a film projection system for use, inter alia, in an arrangement for editing films, which projection system comprises a path for guiding a film, a light source for illuminating the film, a rotatable optical system and a projection screen.

Arrangements of this type are known in which the rotatable optical system comprises, for example, a polygonal right prism and in which during operation of the arrangement each time one frame of a film coacts with one of the side faces of this prism.

Experience has shown that in such arrangements unintended residual time varying deformations and intensity fluctuations of the image reproduced on the projection screen will occur due to both fundamental and practical causes, such as the manufacturing tolerances of the prism, which phenomena the viewer will find extremely objectionable.

It is an object of the invention to at least minimize and possibly eliminate such image deformations and intensity fluctuations in an arrangement of the above type.

To achieve this object, the rotatable optical system comprises an endless support carrying a plurality of uniformly spaced identical object lenses whose nodal points can move along a path, at least a portion of which has a distance from the film guiding path, which is substantially equal to the focal distance of the object lenses; in this portion of the support each time N object lenses coacting with N associated film frames, in which N is any integer or fraction equal to or greater than the unit; the beam or the plurality of mutually parallel beams emanating from the object lenses being projected and brought into register, respectively, on the projection screen by means of one projection lens.

Although the above arrangement results in a considerable reduction of the image deformations indeed, it appears that in such a projection system the projection of each individual point of the film on the screen still has a residual unintended motion that is objectionable to the viewer.

To minimize and possibly eliminate this phenomenon, each object lens on the support may be designed in a special manner so that it has such a distortion that the beam emanating from the object lens and associated with a specific point of a film frame is displaced parallel to itself during the movement of the film and the support.

The invention will be described in greater detail hereinafter with reference to the accompanying drawings, in which.

Figure 1:
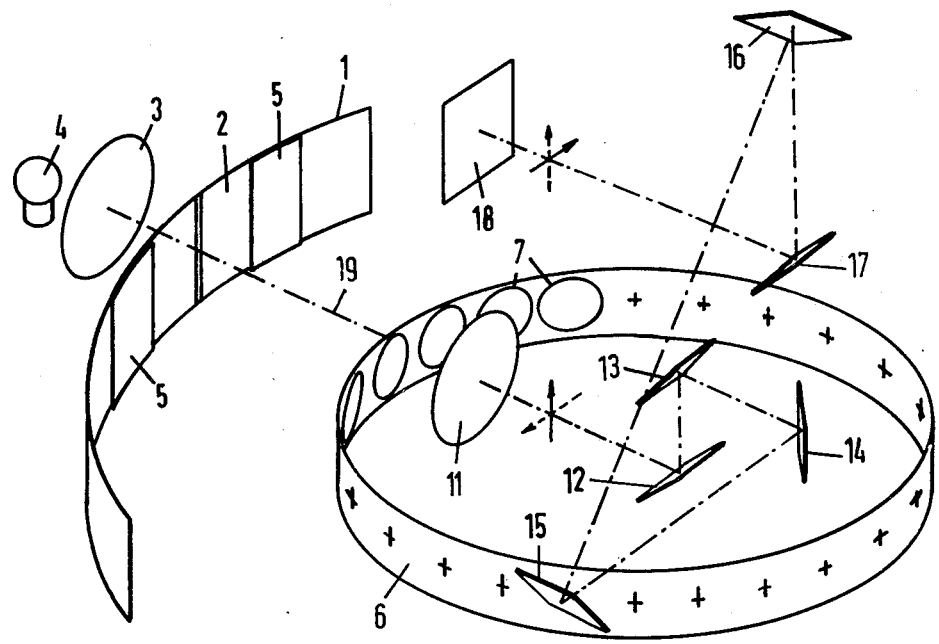
FIG. 1 is a schematic, perspective drawing of an arrangement according to the invention, in which, by way of example, two film frames coact with two object lenses.

FIG. 1 shows a film strip 1 with a plurality of film frames 2. Film strip 1 can be passed along a path, a portion of which is shown in the drawing as part of a circular arc. The film strip 1 can be illuminated by a light source 4 through an appropriate optical system 3, shown in the drawing as a condenser lens. The light passing through successive film frames 2 of film strip 1 is confined by window 5 mounted adjacent to the path of the film strip.

A support 6 designed to traverse an endless path is mounted at a distance from the path of the film strip on the same side as window 5. In the present embodiment this endless path has the form of a circle. Support 6 carries uniformly spaced identical object lenses 7 so that the mutual distance between the front nodal points i.e. the nodal points related to the film side of the object lenses is equal or approximately equal to the film pitch, i.e. the centre-to-centre distance of two adjacent film frames.

Figures 2, 3:
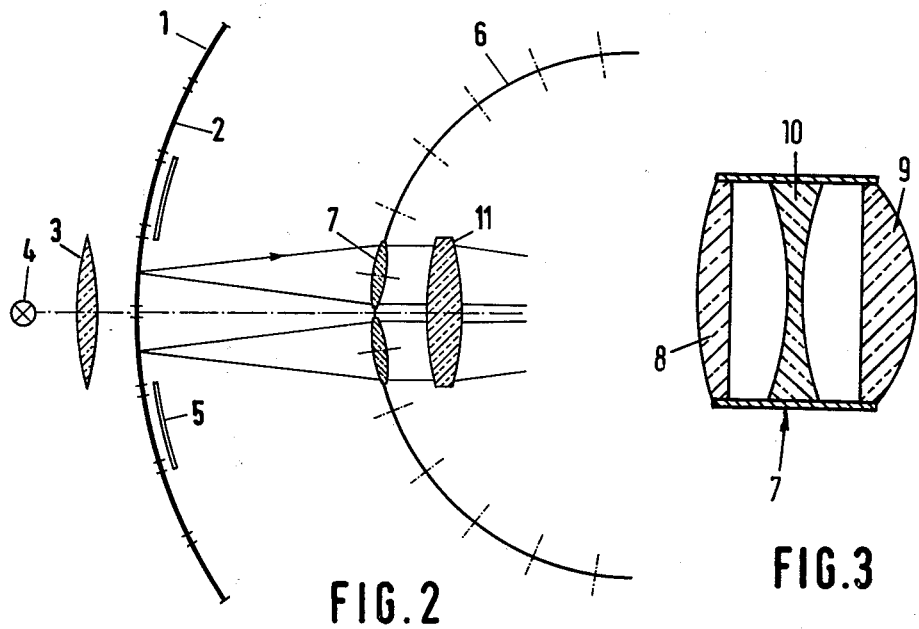
FIG. 2 shows a top view of a portion of the arrangement shown in FIG. 1.
FIG. 3 shows an object lens to be used in such an arrangement.

To achieve maximum aperture, given the mutual distance of the nodal points, the object lenses are preferably implemented as shown in FIG. 3. As appears from this drawing, object lens 7 includes two positive elements 8 and 9 and one negative element 10, the front nodal point lying in or near positive element 9 of greatest power. As a result, object lenses with maximum aperture can be mounted in juxtaposed relationship and with the required interspaces on support 6.

The distance between the path traversed by the nodal points of the object lenses and the trajectory of film strip 1 is, at least in the area defined by window 5, substantially equal to the focal distance of object lenses 7. The mutual distance between the nodal points of these object lenses 7 is such, that for the intended projection by the arrangement each object lens coacts and remains coactive with one particular film frame 2 of film strip 1. It will be clear that the velocities of film strip 1 and support 6 play a part in this operation, as will be elucidated hereinafter.

As appears particularly from FIG. 2, a stationary projection lens 11 is mounted on the parallel exit beams of object lenses 7. During operation of the arrangement, projection lens 11 projects those parallel beams emanating from one or more than one object lens 7 onto a projection screen mounted in the focal plane of this lens 11. The convergent light beams emanating from projection lens 11 impinge upon a mirror system intended for deflecting the emanating light out of the plane of support 6 and also for rotating each image formed on the projection screen over 90° relative to the associated film frames so as to permit viewing of the final image in the proper position on the screen.

As shown in FIG. 1, the mirror system comprises, by way of example, a plurality of reflecting surfaces 12, 13, 14, 15, 16 and 17, which rotate the projected image over 90° relative to the image position on the film strip.

It will be clear that, due to the displacement of the image relative to support 6, in this manner an upright image can be produced on the projection screen, which image may be viewed without obstruction by this support.

In the drawing, the various orientations are indicated by full and broken lines.

In will further be clear that the reflecting surfaces may be faces of a prism; it is essential, however, that the orientation of the reflecting surfaces is such that the required displacement and rotation of the beam is realized.

It appears that in an arrangement as described above, if the angular velocities at which support 6 and film strip 1 are rotating are selected so that these are in an inversely proportional or substantially inversely proportional relationship with respect to the radius vectors of the circular paths of these components, an image is obtained on projection screen 18 by means of the above optical system that is essentially composed of two superimposed images originating from two adjacent film frames 2 of film strip 1. This superposition continues if film strip 1 and support 6 move in accordance with the above relationship. It appears that in such an arrangement the objectionable deformation and intensity fluctuations occurring in the known arrangements used hitherto have been greatly reduced.

Although the above is still concerned with two adjacent film frames 2 coacting with two adjacent object lenses 7, practice has shown that the aperture of window 5 may be selected to be smaller than the distance occupied by two adjacent film frames 2 on film strip 1, which reduction should not result in a size, however, that is substantially less than the size of one film frame 2. Furthermore, it is also possible to make more than two film frames 2 coact with more than two object lenses 7 so as to produce a superpositional image on projection screen 18. Practice has shown that a maximum of three film frames may be used for this purpose. It will be clear that an increase in the number of film frames requires a larger size projector lens 11, which is disadvantageous. Moreover, the differences between more remote film frames may be such that superposition of these frames results in a blurred image on the screen.

It is further observed that, although in the above it is assumed that support 6 traverses a circular path, this configuration is taken only by way of example. It will be clear that any differently shaped path may be chosen, provided that, in the area of the film gate 5, the distance between the path of the front nodal points of object lenses 7 and the path of film strip 1 is substantially equal to the focal distance of object lenses 7. This implies that the path of film strip 1 may likewise have any configuration, provided that the above mentioned condition is satisfied.

In order to optimally eliminate, in such a system, the aforesaid unintended residual movement of the projection of each individual film point on the screen, in accordance with the invention a specific distortion is introduced into each object lens 7.

Figure 4:
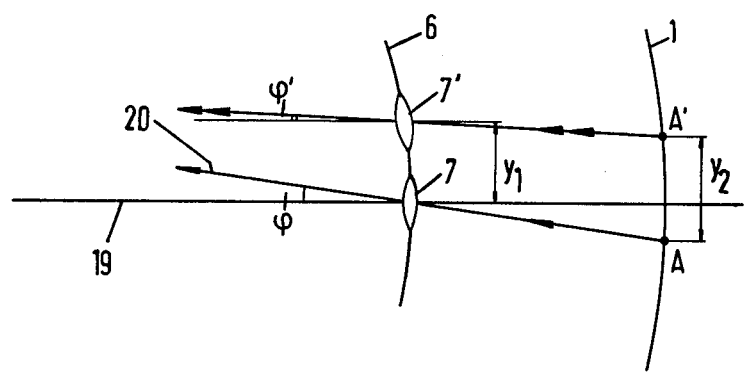
FIG. 4 shows the principal rays associated with a point of the film in two positions of this point while using distortion-free object lenses on the support.
Figure 5:
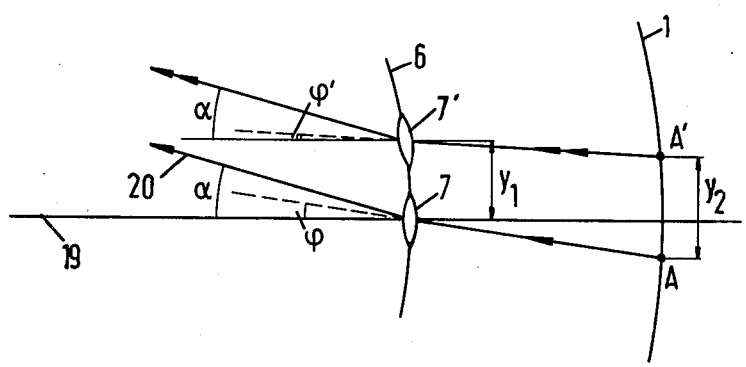
FIG. 5 shows a similar situation in which, however, object lenses according to the invention are used having a specific distortion deliberately introduced therein.

In illustration thereof reference is made to FIGS. 4 and 5. In FIG. 4, 1 designates the film strip carrying a plurality of film frames and 6 designates the support carrying a plurality of object lenses each indicated by 7.

The embodiment shown in FIG. 4 will now be described in detail.

In this figure, A designates a point on film strip 1, this point A being, for example, a point of a film frame (not further indicated) of film strip 1. It is assumed that object lens 7 associated with this film frame is in the position shown in FIG. 4, i.e. having its nodal point on axis 19 of the system. FIG. 4 shows the distortion-free embodiment. A principal ray emanating from point A and traversing through the nodal point of the associated object lens 7 will pass through the object lens towards the screen without deviation. As shown in this figure, the ray associated with point A and emanating from the object lens will enclose an angle $\phi$ with axis 19 of the system.

During operation of the projection system, after a given period of time, point A will have moved along the path of the film strip to the position designated by A'.

This means that, in the vertical direction of the drawing, point A has moved a distance $y_2$ upwards.

As stated earlier, there is a certain relationship between the angular velocities at which the support and the film strip are moved, i.e. these velocities are inversely proportional or substantially inversely proportional to the radius vectors of the circular paths of these components. Consequently, in the period of time during which point A moves to point A' object lens 7 will have moved along the path of support 6 to position 7' in the drawing. The nodal point of this object lens has traversed a distance $y_1$ during this period, which distance $y_1$ is obviously less than distance $y_2$.

This means that a principal ray emanating from the displaced point A' associated with displaced object lens 7' will propagate through the nodal point of this object lens 7' in a straight line. Due to the fact that the distance traversed by the point and the object lens in question differ from each other, this ray of light will now enclose an angle $\phi'$ with a line parallel to the axis of the system, which angle $\phi'$ is smaller than angle $\phi$. The above situation will self-evidently apply to each individual point of each film frame and therefore a film frame, while traversing the path of film strip 1, will be projected by means of the associated object lens 7 of support 6 and a projection lens (not shown in FIG. 4) onto the projection screen (not shown either) in a manner in which the projection performs an unintended residual motion, which is objectionable to the viewer of the projected image.

FIG. 5 shows an arrangement similar to the one shown in FIG. 4 but using object lenses, in which deliberately has been introduced, in accordance with the invention, a distortion, which will now be specified. The figure again shows film strip 1, support 6, object lenses 7 and axis 19 of the system. Considering point A, which corresponds with point A in FIG. 4, the principal ray emanating from this point A and going through the nodal point of object lens 7 will not leave this lens along the broken line corresponding with the line shown in FIG. 4, and enclosing an angle $\phi$ with axis 19, which broken line and angle are shown in FIG. 5 for the purpose of illustration, but as a result of the special design of object lens 7 this ray of light will leave the lens along line 20 enclosing an angle $\alpha$ with axis 19.

When considering again the displacement of point A toward A' through a distance $y_2$ as measured in the vertical direction, which displacement is associated with a displacement in the vertical direction of the nodal point of object lens 7 towards 7', as described above with reference to FIG. 4, the ray of light emanating from point A' will pass through the nodal point of object lens 7' and will not leave this lens on the side facing the screen at an angle $\phi'$, as was the case in FIG. 4 and shown by a broken line in this FIG. 5 for the purpose of illustration, but again at the aforesaid angle $\alpha$, i.e. parallel with the principal ray emanating from object lens 7 in the position of point A considered first.

It will be clear that the above observations with respect to point A apply similarly to all other points of the film frames of film strip 1 and that, therefore, the beam associated with each individual point of the film and emanating from the respective object lens is displaced parallel to itself during the movement of the film and the support. In this manner the unintended residual motions in the image formed on the screen by these emanating beams are eliminated for all moments in time, and hence the aforesaid, objectionable residual deformation of the projected image, as occurring when using the arrangement shown in FIG. 4, is eliminated.

Since, as appears from FIG. 5, the angles $\alpha$ are equal to each other but angle $\phi$ differs from angle $\phi'$, it applies that $\alpha - \phi \neq \alpha - \phi'$.

It has appeared that, in order to keep angle $\alpha$ constant in all positions of any given point A during the film transport, a difference angle $\alpha - \phi$ is required, which angle is proportional to the third power of the field angle of each object lens, in other words that $\alpha - \phi = \Delta \psi = a\psi^3$, in which $\psi$ is the field angle of the object lens and $a$ is a constant that depends upon the ratio of the radii of the paths traversed by the film strip and the support.

In particular, $a = 1/6k(1+k)$, in which $k = r/R$, in which $r$ is the radius of the path of the support and $R$ is the radius of the path of the film strip.

In the special case that the ratio of the two radii is 1:2, the distortion to be introduced into the object lens, must be 8.6°/$_{oo}$ at a field angle of the object lens of 15°. This example shows that the distortion present in a complete image projected on the screen will not be objectionable to the viewer at all.

It is observed that, although the above is concerned with a film projection system, in connection with the reversibility of the paths of the light rays the present invention is applicable to a film camera system too.

We claim:

1. A film projection system for use, inter alia, in an arrangement for editing films, which projection system includes a curved path for guiding a film, a light source for illuminating the film, a rotatable optical system and a projection screen, characterized in that said rotatable optical system comprises an endless support carrying a plurality of uniformly spaced identical object lenses, whose front nodal points are spaced apart a distance substantially equal to the centre-to-centre distance of two adjacent film frames and whose front nodal points are positioned along a circular path a portion of which has from said curved film guiding path a distance substantially equal to the focal distance of said object lenses; said object lenses having optical axes which converge at one point on the axis of rotation of the rotatable optical system; in said portion of said support, N object lenses of said object lenses simultaneously coact with N associated film frames, in which N is any integer or fraction greater than the unit; the plurality of parallel beams emanating from said N object lenses being projected and brought into superimposition on the projection screen by means of one projection lens; said projection system being such as to produce respective rotational velocities of the film in said curved path and said object lenses in said circular path which are substantially inversely proportional with respect to the radius vectors of said paths.

2. A film projection system according to claim 1, characterized in that each object lens includes a plurality of elements.

3. A film projection system according to claim 2, characterized in that the object lens comprises two positive elements and one negative element, the front nodal point lying in or near the positive element of highest refractive power.

4. A film projection system according to claim 1, 2 or 3, characterized in that each object lens of the support has a distortion such that the beam associated with a given point of a film frame and emanating from the object lens remains parallel to its original orientation during the movement of the film and the support.

5. A film projection system according to claim 1, characterized by a mirror system for deflecting the light beams emanating from the projection lens out of the plane in which said support is movable and for rotating the image formed on the projection screen through 90° relative to the associated film frames.

6. A film projection system for use, inter alia, in an arrangement for editing films, which projection system comprises a path for guiding a film, a light source for illuminating the film, a rotatable optical system and a projection screen, characterized in that said rotatable optical system comprises an endless support carrying a plurality of uniformly spaced identical object lenses, whose front nodal points can move along a path at least a portion of which has from said film guiding path a distance substantially equal to the focal distance of said object lenses; in said portion of said support each time N object lenses coacting with N associated film frames, in which N is any integer or fraction equal to or greater than the unit; the beam or the plurality of parallel beams emanating from said object lenses being projected and brought into register, respectively, on the projection screen by means of one projection lens, wherein the distortion satisfies the equation $\Delta\psi = a\psi^3$ in which $\Delta\psi$ is the distortion, $\psi$ is the field angle of each object lens and $a$ is a proportionality constant.

7. A film projection system according to claim 6, characterized in that a satisfies the equation $a = 1/6k(1+k)$ in which $k = r/R$, in which $r$ is the radius of the path of the support carrying the object lenses and $R$ is the radius of the path of the film strip.

8. A film projection system according to the claim 5 or 7, characterized in that when r/R has a ratio of 1:2, the distortion is 8.6°/$_{oo}$ at a field angle of each object lens of 15°.

* * * * *